Jan. 11, 1955     K. WYSOCKI     2,699,278
AUTOMATIC CARTON-LOADING MACHINE

Filed July 9, 1954     2 Sheets-Sheet 1

Jan. 11, 1955      K. WYSOCKI      2,699,278
AUTOMATIC CARTON-LOADING MACHINE

Filed July 9, 1954      2 Sheets-Sheet 2

United States Patent Office 2,699,278
Patented Jan. 11, 1955

2,699,278

AUTOMATIC CARTON-LOADING MACHINE

Kazmier Wysocki, Maywood, N. J., assignor to Progressive Machine Company, Hackensack, N. J., a partnership Application July 9, 1954, Serial No. 442,329

14 Claims. (Cl. 226—14)

This invention is directed to automatic carton-loading machines and, more particularly, to machines for automatically loading containers such as bottles into cartons that include a plurality of cells or compartments.

In the packing of individual objects such as frangible glass bottles into individual protective cells of cardboard cartons it heretofore has been the practice in some instances to perform this operation by hand, particularly when the bottles were small and their contents expensive, as is the case with certain medicines. This has proved time-consuming and costly since it required the services of a sizeable staff to pack these objects in a limited period of time.

Automatic machinery has also been employed to some extent to load bottles into cellular cartons. The usage of such machinery, however, has not been as widespread as would ordinarily be expected, primarily because of the complexity and cost of the equipment.

It is an object of the present invention, therefore, to provide a new and improved automatic carton-loading machine for effectively and efficiently loading containers into the cellular compartments of cartons, which containers may be small.

It is a further object of the invention to provide a machine for automatically loading bottles into the cellular compartments of containers, which machine is simple in construction and relatively inexpensive to manufacture.

In accordance with a particular form of the invention, an automatic carton-loading machine comprises a first conveyor including spaced guideways for delivering rows of containers, and a second reciprocable conveyor for delivering during the forward movement thereof to a position beneath the exit end of the first conveyor individual cartons having therein rows of cellular compartments and for returning during the reverse movement thereof to a carton-receiving position. The carton-loading machine further includes a rotor disposed transversely of the first conveyor at the exit end thereof and including a plurality of radially projecting placement means for directing the movement of successive transverse rows of the containers from the first conveyor to a gravity-loading position over successive transverse rows of the compartments. The automatic carton-loading machine additionally comprises a mechanism including a common driving means for the second conveyor and the rotor for turning the rotor in synchronous relation with the forward movement of the second conveyor and including means for maintaining the rotor in a fixed position during the reverse movement thereof.

For a better understanding of the invention, together with other and further objects thereof, reference is had to the following description taken in connection with the accompanying drawings, and its scope will be pointed out in the appended claims.

Referring to the drawings, Fig. 1 is an elevational view, with portions in section, of an automatic carton-loading machine in accordance with the invention;

Description of carton-loading machine

Figure 1:
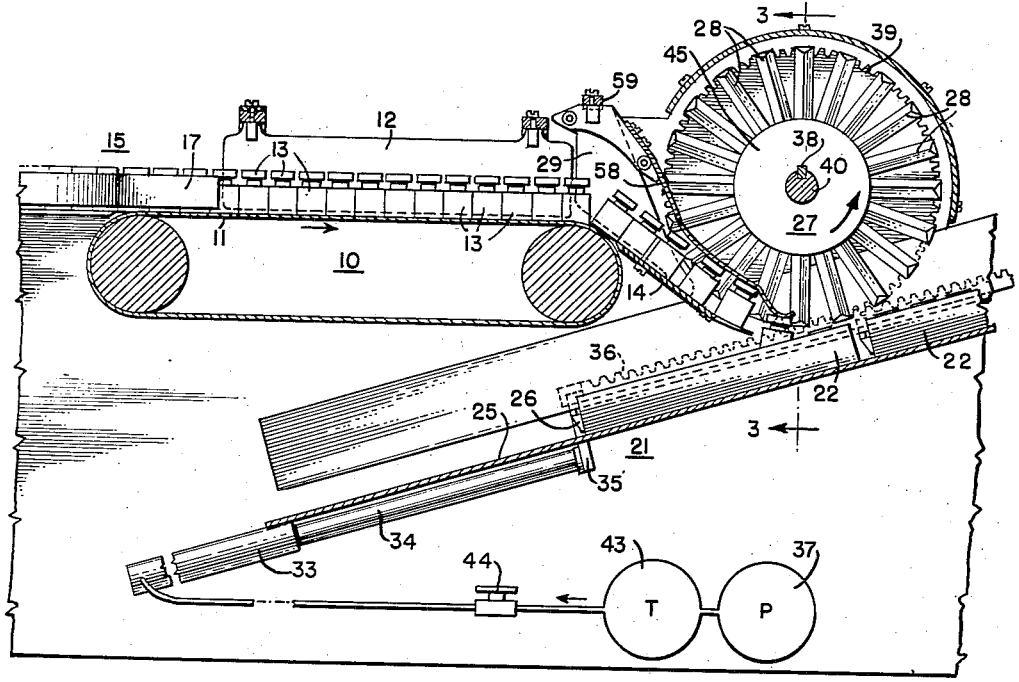
Figure 2:
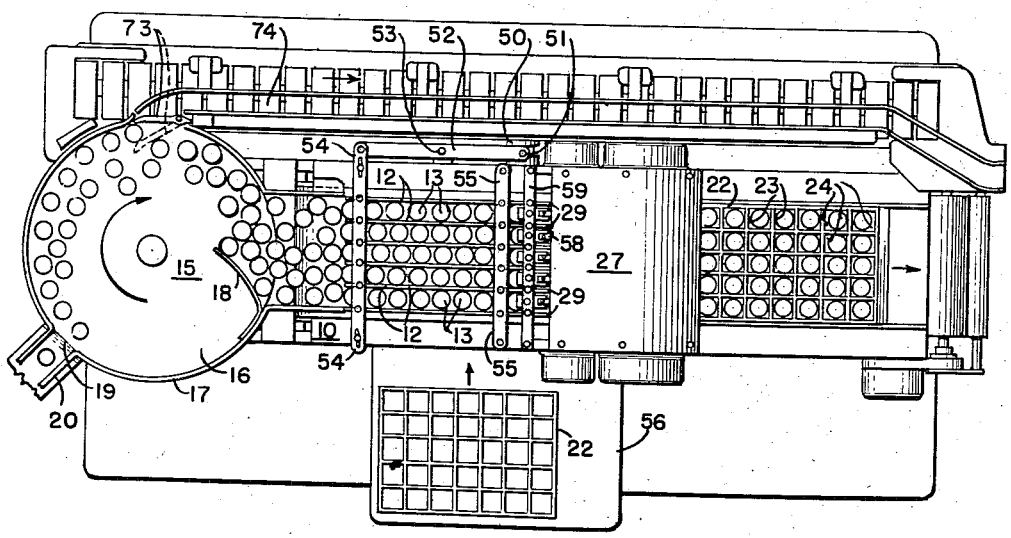
Fig. 2 is a plan view thereof.

Referring now to the drawings, there is represented in Figs. 1 and 2 a first conveyor 10 including an endless belt 11 rotatable in a horizontal plane beneath a plurality of spaced guideways 12, 12 for delivering in a predetermined direction a plurality of rows of containers such as small bottles 13, 13 of liquid medicine or other material to a delivery chute 14 at the exit end of the conveyor. The endless belt 11, which may be of conventional construction, is rotated in the direction indicated in Fig. 1 by suitable means such as a motor (not shown). This motor also drives a rotary cam 50 (see Fig. 2), and a cam follower 51 is secured to one end of a lever 52 pivoted at point 53. The other end of the lever 52 is pivotally connected to a horizontal bar 54 secured to each of the separators 12 near one end thereof. The separators are made of spring steel and the other ends thereof are connected to a horizontal bar 55 which is rigidly secured to the frame of the machine. One end of the chute 14 is closely adjacent the exit or delivery end of the belt 11, as shown in Fig. 1, while the other end thereof is at a lower level for a purpose to be made clear hereinafter.

The automatic carton-loading machine further includes a rotary disk magazine 15 for feeding containers to the receiving end of the endless belt 11 of conveyor 10 across the width of the belt. This magazine includes a disk 16 which is rotatable in a horizontal plane in the direction indicated in Fig. 2 by suitable means such as a motor (not shown). A sheet metal fence 17 is disposed about the most of the periphery of the disk and terminates in an abutment 18 which is substantially radially positioned near the receiving end of the conveyor 10. If desired, the magazine 15 may include an inlet 19 associated with a conveyor 20 for feeding bottles to the magazine.

Another reciprocable conveyor 21 is disposed at an angle beneath the first conveyor 10 (see Fig. 1) for delivering in substantially the same direction as the first conveyor during the forward movement of conveyor 10 to a position beneath the delivery chute 14 thereof individual cartons 22, 22 having therein rows of cellular bottle-receiving compartments 23, 23 (see Fig. 2) formed by spacers 24, 24 and for returning during the reverse movement thereof to a carton-receiving position. This conveyor includes a stationary inclined plate 25 and a movable push bar 26 (see Figs. 1 and 3) which is disposed transversely of the plate and is arranged for movement relative to the latter by mechanism to be described subsequently. The cartons 22 and the spacers 24 are ordinarily made of cardboard to protect the bottles from being broken due to rough handling in transit. A platform 56 (see Fig. 2) is positioned to one side of the conveyor 21 and supports an empty carton 22 which is manually fed to the conveyor 21 at the proper time.

Figure 4:
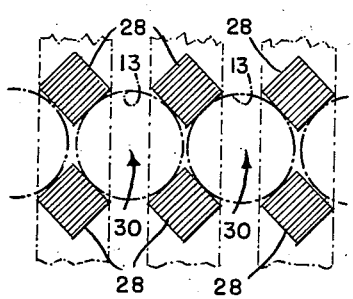
Fig. 4 is a bottom plan view of a portion of the mechanism of Fig. 3.

The carton-loading machine also comprises a rotor 27 disposed transversely of the conveyor 10 at the exit end thereof above the chute 14 (see Fig. 1) and including a plurality of transverse rows of projecting placement means in the nature of radial spokes 28, 28 for directing the movement of successive transverse rows of the bottles 13, 13 from the delivery chute to a gravity-loading position over successive transverse rows of the compartments 23, 23 in a carton 22. The spokes 28, 28 are preferably rectangular in cross section and, as represented in the bottom plan view of Fig. 4, adjacent ones, such as the six there shown, form what may be considered as radial bottle-receiving recesses 30, 30 that serve during rotation to encompass the upper extremities of successive transverse rows of bottles (see also Fig. 1) and direct them along the chute 14 toward its end or gravity-loading position above successive rows of compartments 23, 23 in an advancing carton 22. Spaced separators 29, 29 guide the bottles along the delivery chute 14 and spring steel fingers 58, 58 extend in spaced relation over the chute and between the rows of spokes as represented in Fig. 1. The fingers are secured at their upper ends to a transverse bar 59 (see Fig. 2) secured at its ends to the frame of the machine.

The carton-loading machine further includes a mechanism including a common driving means for the conveyor 21 and the rotor 27 for turning the latter in the direction indicated in Fig. 1 in synchronous relation with the forward movement of the conveyor 21. This mechanism includes means in the form of a one-way clutch comprising a pawl 31 and a ratchet 32 (see Fig. 3) for rotating the rotor 27 during the forward movement of conveyor 21. The mechanism also includes a pawl 60 and a ratchet wheel 61 for maintaining the rotor 27 in a fixed position during the reverse movement of the conveyor 21. The common driving means mentioned above comprises a reciprocating motor such as an air cylinder 33 and piston rod 34 (see Fig. 1), the piston rod having its outer end suitably connected as by a bracket 35 to a toothed rack 36 extending longitudinally along one side of the plate 25. The reciprocating motor is actuated by an air supply or tank 43 and is controlled by a treadle-operated valve 44. A pump 37 is connected to the tank 43. The lower end of the rack 36 carries the transverse push bar 26 which is so positioned as to engage the rear end of a carton 22 resting on the plate 25 as represented in Fig. 3.

Figure 3:
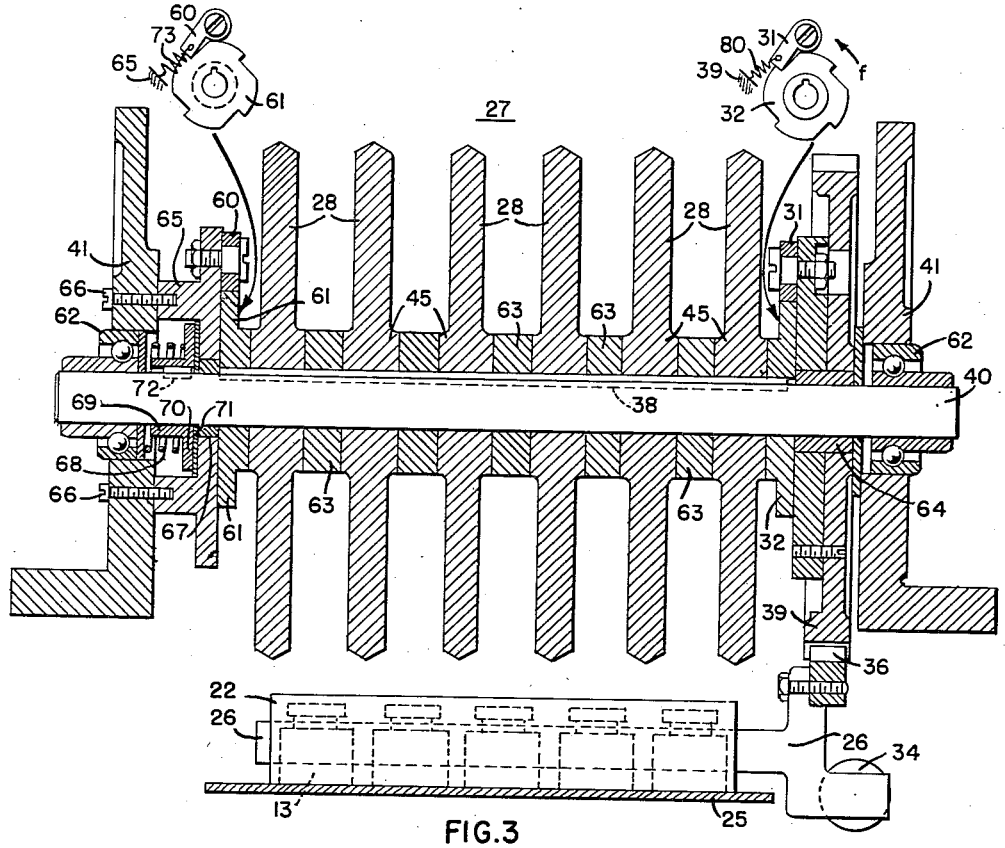
Fig. 3 is a sectional view along the line 3—3 of Fig. 2 with some of the parts removed.

The rack 36 engages a large gear 39 which, but for the pawl and ratchet mechanism 31, 32, is freely rotatable on a bearing 64 relative to a shaft 40 which in turn is journalled near its ends in brackets 41, 41 on the sides of the machine (see Fig. 3). The shaft 40 is secured to the ratchet wheel 32 and to hubs 45, 45 of the radial spokes 28, 28 (see Figs. 1 and 3) by a key 38 and is rotatable in ball bearings 62, 62 in the brackets 41, 41. Separators 63, 63 are keyed to the shaft 40 and laterally space the spokes 28, 28 thereon. The pawl 31 is pivotally mounted on the gear 39 and is biased into engagement with the teeth of the ratchet wheel by a spring 80 secured to the gear 39.

The ratchet wheel 61 is also secured to shaft 40 by the key 38. The pawl 60 is pivotally mounted on a hollow member 65 which is secured against rotation to one of the brackets 41 by bolts 66, 66, as represented in Fig. 3. The pawl 60 is secured at one end to member 65 by a spring 73. The shaft 40 rotates in a bearing 67 in the member 65. A spring 68 encompasses a portion of a collar 69 having an enlarged or flanged end 70 which is thrust by the action of the spring against a disk 71 of friction material which in turn exerts a thrust against an inner face of the hollow member 65. The collar 69 is keyed to the shaft 40 by a key 72 but is free to move axially thereon.

A pivoted gate 73 (see Fig. 2) may be swung into the broken-line position to route bottles from the magazine 15 to a conveyor 74 to by-pass the conveyor 10 and the rotor 27 when desired.

*Explanation of operation of carton-loading machine*

In considering the operation of the carton-loading machine, it will be assumed initially that gate 73 is closed, the conveyor 20 is feeding bottles 13, 13 to the rotary magazine 15, and that the latter has supplied the conveyor 10 with rows of bottles controlled by the spaced guideways 12, 12 over the endless belt 11. It will also be assumed that the treadle-operated valve 44 has been operated progressively to displace the rack 36 and its push bar 26 to the position represented in Fig. 1 where an empty transverse row of compartments 23, 23 is presented beneath the end of the delivery chute 14 constituting the gravity-loading position of the rotor 27. The motor driving the conveyor 10 rotates the cam 50 and cam follower 51 serves to oscillate the lever 52 about point 53, thereby causing arm 54 periodically and laterally to displace the forward ends of the spring steel spacers 12, 12. This small displacement aids in orienting the oncoming bottles from the magazine 15 into distinct rows for movement between the spacers along the belt 11. The upward and forward movement of the rack 36 produced by the air cylinder 33 and piston rod 34 serves to rotate the large gear 39 in the direction indicated by the arrow in the hub 45 of the rotor 27. The pawl 31, which is pivotally mounted on the gear 39 and is biased into engagement with the teeth of ratchet wheel 32 as described above, causes the latter to rotate with the gear 39 in the direction represented by the solid-line arrow *f* near the ratchet wheel 32 in Fig. 3. The small end view of ratchet wheel 32 is the representation thereof as viewed from the left. Since the ratchet wheel 32 is secured to the shaft 40 for rotation therewith by key 38 and the radial spokes 28, 28 are keyed to that shaft, the indicated rotation of the gear 39 and the ratchet wheel 32 causes the rotor 27 to turn in the same direction and at the same time causes the spokes 28, 28 to engage successive transverse rows of bottles on the delivery chute 14, as represented in Figs. 1 and 2. The upper extremities of these bottles are confined in the bottle-receiving recesses 30, 30 and the bottles are moved by the rotor to the gravity-loading position over an empty row of compartments 23, 23 in the upwardly and forwardly advancing carton 22. The spring steel fingers 58, 58 extending between the spokes 28, 28 of the rotor 27 hold the bottles down on the chute 14 and assist in discharging the lowest row of bottles from between the spokes of the rotor. As each row of bottles reaches this lowest position, it is free to drop by gravity into its proper position in an empty row of compartments in the carton.

During the forward rotation of the rotor 27, the key 72 on the rotating shaft 40 causes collar 69 to rotate therewith. Spring 80 serves to thrust the flange 70 on the collar against the friction disk 71 which in turn rests against the fixed hollow member 65. Consequently a light frictional drag is exerted on the rotor 27, which drag is sufficient to prevent the pressure of the bottles from the conveyor 10 from rotating the rotor when the treadle 44 is not operated.

When the rack 36 and the push bar 26 have reached the upper end of their travel as determined by the length of the stroke of the piston rod 34, the carton 22 is filled and then can be removed from the plate 25 by an operator or can be carried forward on a horizontal moving belt conveyor. The carton can then be sealed in a customary manner. The treadle-operated valve 44 is then operated so as to return the rack 36 and push bar 26 to their lower or carton-receiving position. During the return movement of the rack 36, the rotor 27, shaft 40, and ratchet wheel 32 remain stationary but the large gear 39 and the pawl 31 secured thereto rotate about the bearing 64 on shaft 40 (see Figs. 1 and 3). As viewed in Fig. 1, this rotation of the gear 39 is clockwise and causes the pawl 31 (see right-hand end view detail in Fig. 3) to ride clockwise over the tops of the teeth of ratchet wheel 32. Rotation of the rotor 27 during the return movement of the rack 36 is prevented by the pawl 60 and the ratchet wheel 61. As previously stated, the ratchet wheel 61 is keyed to the shaft 40 for the rotor 27. The arrangement of the ratchet wheel 61 and its pawl 60, when viewed from the left as shown in the left-hand end view detail in Fig. 3, is such that the pawl fits into a notch in the ratchet wheel. Since pawl 60 is secured to the stationary hollow member 65, it prevents the rotor 27 from being rotated during the return stroke of the rack 36. When the rack 36 and the push bar 26 have reached their lowermost or carton-receiving position, an empty carton is placed on the plate 25 just ahead of the push bar and, by operating valve 44, the operator causes the carton-loading machine to undergo another cycle of operation.

In the event that a loading operation is to be performed with a run of bottles of a size differing from the last run, the rotor 27 is removed from its supporting brackets 41, 41 and a different rotor is inserted, which rotor has spokes 28, 28 and separators 63, 63 of a size to accommodate the new bottles. Likewise, a set of spacers 12, 12 and transverse bars 54, 54 of dimensions to accommodate the new run of bottles are installed. It may also be necessary to install a different set of separators 29, 29 and fingers 58, 58 over the chute 14. Thus, by using elements designed to accommodate individual ones of particular size bottles, the automatic carton-loading machine functions as a precision article-handling device and presents the minimum of operational difficulties.

From the foregoing description, it will be seen that a carton-loading machine in accordance with the present invention is relatively simple in construction and capable of assuring fast and reliable operation which is always under the full control of the operator.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What I claim is:

1. An automatic carton-loading machine comprising: a first conveyor including spaced guideways for delivering rows of containers; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a common driving means for said second conveyor and said rotor for turning said rotor in synchronous relation with said forward movement of said second conveyor and including means for maintaining said rotor in a fixed position during said reverse movement thereof.

2. An automatic carton-loading machine comprising: a first conveyor including an endless belt and spaced longitudinal, laterally vibrated guideways for delivering rows of containers; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a common driving means for said second conveyor and said rotor for turning said rotor in synchronous relation with said forward movement of said second conveyor and including means for maintaining said rotor in a fixed position during said reverse movement thereof.

3. An automatic carton-loading machine comprising: a first conveyor including spaced guideways and a delivery chute for delivering rows of containers; a second reciprocable conveyor for delivering during the forward movement thereof to a position beneath said delivery chute individual cartons having therein rows of cellular compartments and for returning during the reverse movement thereof to a carton-receiving position; a rotor disposed transversely of said first conveyor above said delivery chute and including a plurality of radially projecting placement means for directing the movement of successive transverse rows of the containers from said delivery chute to a gravity-loading position over successive transverse rows of the compartments; and mechanism including a common driving means for said second conveyor and said rotor for turning said rotor in synchronous relation with said forward movement of said second conveyor and including means for maintaining said rotor in a fixed position during said reverse movement thereof.

4. An automatic carton-loading machine comprising: a first conveyor including spaced guideways for delivering rows of containers; a magazine for feeding containers to said first conveyor; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a common driving means for said second conveyor and said rotor for turning said rotor in synchronous relation with said forward movement of said second conveyor and including means for maintaining said rotor in a fixed position during said reverse movement thereof.

5. An automatic carton-loading machine comprising: a first conveyor including spaced guideways for delivering rows of containers; a rotary disk magazine for feeding containers to said first conveyor across the width thereof; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a common driving means for said second conveyor and said rotor for turning said rotor in synchronous relation with said forward movement of said second conveyor and including means for maintaining said rotor in a fixed position during said reverse movement thereof.

6. An automatic carton-loading machine comprising: a first conveyor including spaced guideways for delivering rows of bottles in a predetermined direction; a second reciprocable conveyor for delivering in substantially said predetermined direction during the forward movement thereof to a position beneath the exit end of said first conveyor individual cartons having therein rows of cellular bottle-receiving compartments and for returning during the reverse movement thereof to a carton-receiving position; a rotor disposed transversely of said first conveyor at said exit end thereof and including a plurality of radially projecting placement means for directing the movement of successive transverse rows of the bottles from said first conveyor to a gravity-loading position over successive transverse rows of the compartments; and mechanism including a common driving means for said second conveyor and said rotor for turning said rotor in synchronous relation with said forward movement of said second conveyor and including means for maintaining said rotor in a fixed position during said reverse movement thereof.

7. An automatic carton-loading machine comprising: a first conveyor including spaced guideways for delivering rows of containers; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a rack on said second conveyor and a pinion on said rotor in engagement with said rack for turning said rotor in synchronous relation with said forward movement of said second conveyor and including means for maintaining said rotor in a fixed position during said reverse movement thereof.

8. An automatic carton-loading machine comprising: a first conveyor including spaced guideways for delivering rows of containers; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a rack on said second conveyor, a pinion on said rotor in engagement with said rack, and a motor coupled to said mechanism for turning said rotor in synchronous relation with said forward movement of said second conveyor and including means for maintaining said rotor in a fixed position during said reverse movement thereof.

9. An automatic carton-loading machine comprising: a first conveyor including spaced guideways for delivering rows of containers; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a rack on said second conveyor, a pinion on said rotor in engagement with said rack, and a reciprocable motor coupled to said rack for turning said rotor in synchronous relation with said forward movement of said second conveyor and including means for maintaining said rotor in a rotor in a fixed position during said reverse movement thereof.

10. An automatic carton-loading machine comprising: a first conveyor including spaced guideways for delivering rows of containers; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a rack on said second conveyor, a pinion on said rotor in engagement with said rack, and a reciprocable motor coupled to said rack for turning said rotor in synchronous relation with said forward movement of said second conveyor and including a one-way clutch for maintaining said rotor in a fixed position during said reverse movement thereof.

11. An automatic carton-loading machine comprising: a first conveyor including spaced guideways for delivering rows of containers; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a rack on said second conveyor, a pinion on said rotor in engagement with said rack, and a reciprocable motor coupled to said rack for turning said rotor in synchronous relation with said forward movement of said second conveyor and including a pawl and ratchet means for maintaining said rotor in a fixed position during said reverse movement thereof.

12. An automatic carton-loading machine comprising: a first conveyor including spaced guideways for delivering rows of containers; a second reciprocable conveyor for delivering during the forward movement thereof to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of transverse rows of radially projecting spokes for directing the movement of successive transverse rows of the containers from said first conveyor to a gravity-loading position over successive transverse rows of the compartments; and mechanism including a common driving means for said second conveyor and said rotor for turning said rotor in synchronous relation with said forward movement of said second conveyor and including means for maintaining said rotor in a fixed position during said reverse movement thereof.

13. An automatic carton-loading machine comprising: a first conveyor including spaced guideways for delivering rows of containers in a predetermined direction; a second reciprocable conveyor disposed at an angle beneath said first conveyor for delivering in substantially said predetermined direction during the forward movement of said second conveyor to a position beneath the exit end of said first conveyor individual cartons having therein rows of cellular compartments and for returning during the reverse movement thereof to a carton-receiving position; a rotor disposed transversely of said first conveyor at said exit end thereof and including a plurality of radially projecting placement means for directing the movement of successive transverse rows of the containers from said first conveyor to a gravity-loading position over successive transverse rows of the compartments; and mechanism including a common driving means for said second conveyor and said rotor for turning said rotor in synchronous relation with said forward movement of said second conveyor and including means for maintaining said rotor in a fixed position during said reverse movement thereof.

14. An automatic carton-loading machine comprising: a first conveyor including spaced guideways and a delivery chute for delivering rows of containers in a predetermined direction; a rotary disk magazine for feeding said containers to said first conveyor across the width thereof; a second reciprocable conveyor disposed at an angle beneath said first conveyor for delivering in substantially said predetermined direction during the forward movement of said second conveyor to a position beneath said delivery chute individual cartons having therein rows of cellular compartments and for returning during the reverse movement thereof to a carton-receiving position; a rotor disposed transversely of said first conveyor above said delivery chute and including a plurality of radially projecting placement means for directing the movement of successive transverse rows of the containers from said delivery chute to a loading position over successive transverse rows of the compartments where successive transverse rows of the container are free to drop by gravity into successive transverse rows of the compartments; and mechanism including a rack on said second conveyor, a pinion on said rotor in engagement with said rack, and a reciprocable motor coupled to said rack for turning said rotor in synchronous relation with said forward movement of said second conveyor and including a pawl and ratchet means for maintaining said rotor in a fixed position during said reverse movement thereof.

References Cited in the file of this patent

UNITED STATES PATENTS 2,319,167     Stewart _____ May 11, 1943